(12) United States Patent  (10) Patent No.: US 7,631,048 B2
De Treville  (45) Date of Patent: Dec. 8, 2009

(54) METHOD AND SYSTEM FOR PERSONAL POLICY-CONTROLLED AUTOMATED RESPONSE TO INFORMATION TRANSFER REQUESTS

(75) Inventor: John De Treville, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1251 days.

(21) Appl. No.: 10/671,185

(22) Filed: Sep. 24, 2003

(65) Prior Publication Data

US 2005/0066010 A1    Mar. 24, 2005

(51) Int. Cl.
G06F 15/16 (2006.01)
H04K 1/00 (2006.01)
G06F 15/173 (2006.01)

(52) U.S. Cl. .................... 709/207; 709/225; 709/223; 705/75

(58) Field of Classification Search ............. 709/207, 709/225, 223; 705/75
See application file for complete search history.

(56) References Cited

U.S. PATENT DOCUMENTS

| | | | |
|---|---|---|---|
| 6,678,516 B2* | 1/2004 | Nordman et al. | 455/414.1 |
| 7,437,752 B2* | 10/2008 | Heard et al. | 726/1 |
| 2005/0086061 A1* | 4/2005 | Holtmanns et al. | 705/1 |

OTHER PUBLICATIONS

"Using Attribute Certificates with Mobile Policies in Electronic Commerce Applications", by Vinti Doshi, Amgad Fayad, Syushil Jajodia, Roswitha MacLean, Proceedings 16th Annual Computer Security Applications Conference, p. 298-3007; IEEE Comput. Soc., Los Alamitos, CA, 2000.

(Continued)

*Primary Examiner*—Tonia L Dollinger
*Assistant Examiner*—Asghar Bilgrami
(74) *Attorney, Agent, or Firm*—Merchant & Gould PC (57) ABSTRACT

A user's computer system sends a policy controlled response to an information request from a requesting computing system. A user policy is set by the user, and the user policy defines parameters, i.e. rules and values, for use in controlling the response information to be provided in reply to information requests from the requesting computing system. When an information request is received from the requesting computing system, parameters of the user policy are applied to the information request to allocate a response and to set a response level based on the user policy. A response based on the response level is created and sent to the requesting computing system. In one embodiment of the invention a policy engine system in a computing cell phone controls automated responses from the computing cell phone to a requesting computing system. The controlled responses are based on a user policy specified by the user of the computing cell phone. The user policy is stored in a database. An apply policy module applies rules of the user policy to information requests from the requesting computing system. It also filters stored response information to create a filtered response for the requesting computing system based on the rules of the user policy. A delegate response module sends the filtered response along with a use policy to the requesting computing system. The use policy controls use of the information in the filtered response by the requesting computing system.

20 Claims, 6 Drawing Sheets

OTHER PUBLICATIONS

"Trust-Based Security in Pervasive Computing Environments", by Lalana Kagal, Tim Finin, and Anupam Joshi, Journal: Computer vol. 34, No. 12, p. 154-7; IEE Comput. Soc., Dec. 2001.

"A Mobile Network Architecture with Personalized Instant Information Access", by Z. Sahinoghlu, F. Matsubara, K.A. Peter, and J. Cukier, 2002 Digest of Technical Papers, International Conference on Consumer Electronics (IEEE Cat. No. 02CH37300), p. 34-5; IEEE, Piscataway, NJ, 2002.

"Providing Tailored (Context-Aware) Information to City Visitors," by Keith Cheverst, Nigel Davies, Keith Mitchell, and Paul Smith, Adaptive Hypermedia and Adaptive Web-Based Systems, International Conference, AH 2000, Proceedings (Lecture Notes in Computer Science vol. 1892), p. 73-85; Springer-Verlag, Berlin, Germany, 2000.

"XML-Based Distributed Access Control System," by Javier Lopez, Antonio Mana, and Mariemma I. Yague, E Commerce and Web Technologies, Third International Conference, EC-Webb, 2002, Proceedings (Lecture Notes in Computer Science vol. 2455), p. 203-13; Springer-Verlag, Berlin, Germany, 2002.

"A User Adaptive Mobile Commerce System with a Middlet Application," by Eunseok Lee and Sera Jang, Intelligent Data Engineering and automated Learning—IDEAL 2002, Third International Conference (Lecture Notes in Computer Science vol. 2412), p. 193-9; Springer-Verlag, Berlin, Germany.

"Agent-Based QOS Negotiation for Mobile Users," by Hamid Harroud, Ahmed Karmouch, Tom Gray, and Serguei Mankovski, Proceedings $16^{th}$ Annual Computer Security Applications Conference (ACSAC'00), p. 298-307; IEEE Comput. Soc., Los Alamitos, CA, 1999.

* cited by examiner

METHOD AND SYSTEM FOR PERSONAL POLICY-CONTROLLED AUTOMATED RESPONSE TO INFORMATION TRANSFER REQUESTS

TECHNICAL FIELD

The invention relates generally to the field of personal control of security and privacy when communicating between a user's computing system and a requesting computing system. More particularly, the invention relates to methods and systems for using a personal policy in the user's computing system to control responses to a requesting computing system.

BACKGROUND OF THE INVENTION

The expanded computing capabilities of a personal digital assistant and a cellular phone have resulted in the merger of personal communication and personal computing power. The merger of these two devices will be referred to herein as a computing cell phone. With these new devices there is a need for personal control over automated communications in order to take full advantage of the capabilities of the device.

For example, the computing cell phone, which can be quite mobile, might be continuously polled by commercial requesting computing systems seeking to obtain information from the user and to provide marketing information to the user. More particularly, a requesting computing system in a retail store might poll a computing cell phone carried by a user as the user enters the store or even passes by the store on the street. In effect anytime the user carrying such a computing cell phone enters the communication domain of a requesting computing system, the latter will likely try to open communications with the computing cell phone. The requesting computer system might be mobile itself, adding extra complexity.

Asking the user to interactively grant or deny each request is an inadequate solution, because the work load on the user would quickly become excessive, and because users commonly make mistakes that can lead to security or privacy violations. There is a need for the user to be able to delegate the responsibility of generating these responses to requests sent to the computing cell phone and further there is a need for the user to police these responses both as to nature of the response and use of the response. Further, there is a need for the user's computing cell phone to inform the requesting computing system of any temporary or persistent constraints on its use of information contained in the response. It is with respect to these considerations and others that the present invention has been made.

SUMMARY OF THE INVENTION

In accordance with the present invention, the above and other problems are solved by methods and systems for sending from the user's computing cell phone a policy controlled response to each information request from a requesting computing system. A user policy is set by the user, and the user policy defines parameters for use in controlling the response information to be provided in reply to information requests from the requesting computing system. The user policy parameters include rules and/or values. When an information request is received from the requesting computing system, the parameters, i.e. rules and values, of the user policy are applied to the information request to determine response information and to set a response level based on the user policy. A response based on the response level is created and sent to the requesting computing system.

In accordance with other aspects, the present invention relates to a policy engine system in a computing cell phone for controlling automated responses from the computing cell phone to a requesting computing system. The controlled responses are based on a user policy specified by the user of the computing cell phone. The user policy is stored in a database. An apply policy module applies rules of the user policy to information requests from the requesting computing system. It also filters stored response information to create a filtered response for the requesting computing system based on the rules of the user policy. A delegate response module sends the filtered response along with an appropriate use policy to the requesting computing system. The use policy informs and controls use of the information in the filtered response by the requesting computing system.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
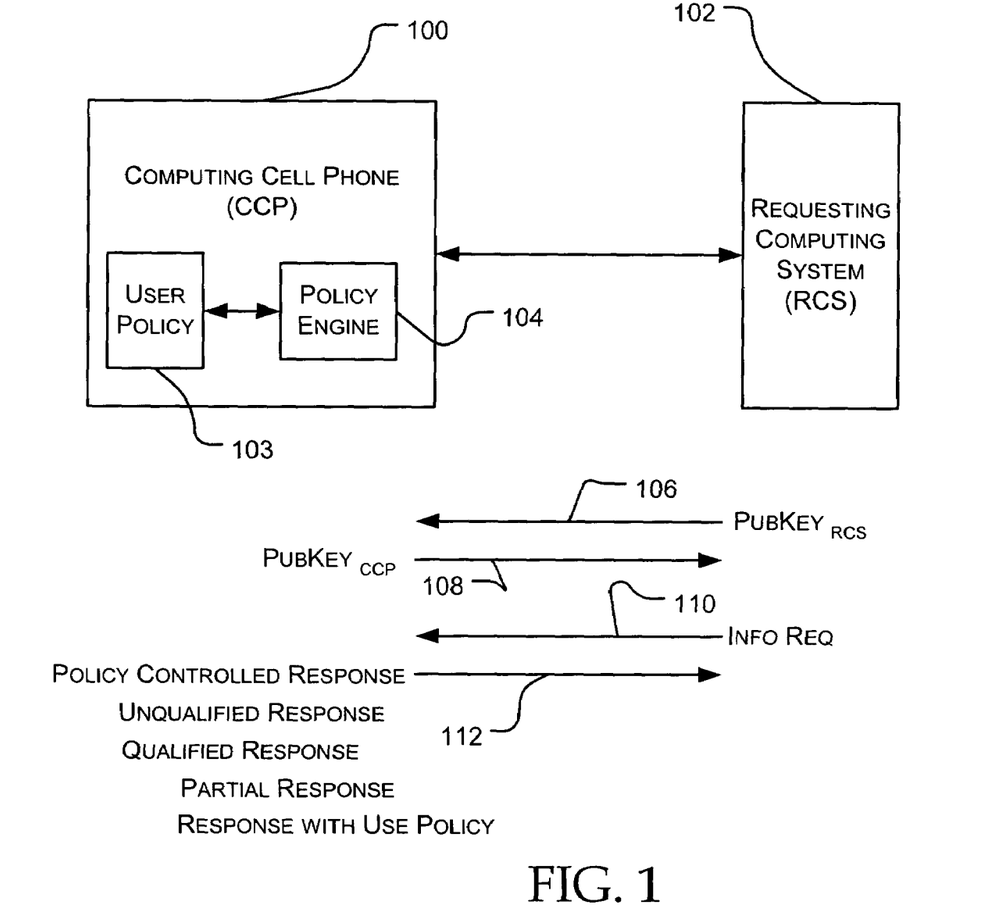
FIG. 1 illustrates communication between a computing cell phone and a requesting computing system.

In FIG. 1 a computing cell phone system 100 carried by a user is being polled by a requesting computing system 102. The computing cell phone 100 contains a stored user policy 103 and a policy engine 104; this policy engine generates the policy controlled responses in response to requests from the requesting computing system. One embodiment of the policy engine is implemented as shown and described hereinafter with reference to FIG. 3.

By way of example, let us assume a user is carrying the computing cell phone (CCP) 100 and enters a clothing store. In effect the user has entered the physical or communication domain of a requesting computing system (RCS) 102 operated by the clothing store. The RCS is broadcasting a polling communication that begins with the sending 106 of one of its public encryption keys—$PubKey_{RCS}$—as part of an appropriate cryptographic protocol. The CCP will respond 108 with one of its public encryption keys—$PubKey_{CCP}$—also as part of an appropriate cryptographic protocol. If the keys are successfully exchanged in this protocol, a communication link is established and additional identity information may be exchanged, such as certificates granted by third parties.

The requesting computing system (RC S) 102 will then likely request 110 the identity of the user from the computing cell phone (CCP) 100 and further request the user's profile so that the RCS 102 can subsequently send targeted marketing information to the CCP. The CCP will provide 112 an automated policy controlled response to the information transfer request 110 of the RCS. This policy controlled response may be an unqualified response, a qualified response, or no response. An unqualified response is a complete response returning to the RCS all of the information requested or permission for the RCS to send the information it wishes to send to the CCP. A qualified response is a complete response with a restricted use policy attached or a partial response with or without a restricted use policy attached. In a partial response, the answer to the query from the RCS is filtered; i.e. the information returned is controlled, by the user policy in the CCP. A complete response or a partial response may have attached to it a restricted use policy in which the CCP notifies the RCS how the information in the response may be used. A use policy when attached to the response will control how the information is used within the RCS, and will control how and if the RCS distributes the information to other computing systems. Clearly, relying on the requesting computing system to enforce this use policy may be appropriate or inappropriate depending on the identity of the requesting computing system, or on other information concerning it, and an appropriate user policy at the CCP should take this into account.

In the event the requesting computing system (RCS) wishes to send information to the computing cell phone (CCP), the information from the RCS might also have a restricted use policy attached. In this case, the use of the information by the CCP would be restricted. Further, the policy engine in the CCP will need to review the user policy to determine if the user wishes to accept information with a restricted use policy.

The policy engine 104 in the computing cell phone CCP 102 will apply the user policy 103 based upon parameters, i.e. values and rules created by the user. Setting and updating the user policy is under the exclusive control of the user. The parameters in the CCP may further depend on parameters i.e. rules and values received over the network from the RCS and from third parties, such as via certificates. Initially the user will define parameters such as those RCS entities it will communicate with, the type and field of information available to each RCS entity, values such as account numbers, sizes, dates, etc. The user may also choose to request and import parameters from a reliable source such as a bank, a chamber of commerce or a professional organization, perhaps transmitted in the form of signed certificates. Request for and receipt of parameters from other computing systems will be under exclusive control of the user so that the user policy cannot be altered without approval of the user.

The user will also prepare responses to predetermined queries from RCS entities. For example, the RCS in the clothing store might be able to obtain information about the user's clothing sizes, the preferred type of clothing—formal or casual, but not able to obtain the user's credit card account number, or the user's address or phone number. As another example, the user policy regarding a query from an RCS at a financial institution, such as a bank or security brokerage, might be to provide user's bank account number, brokerage account numbers, users address, user's current investment portfolio preferences, but not to provide personal information such as family member information, personal calendar, etc. The possibilities are extensive, and the user would be expected to start with a simple user policy and build-up the policy and fine tune the policy as the need arises. The operations of the policy engine provide for this updating of the policy, and most importantly, only the user may update the policy. The user may enter parameters or may choose to accept parameters from other sources, for example a certificate from a chamber of commerce containing a list of competent retailers.

Figure 2:
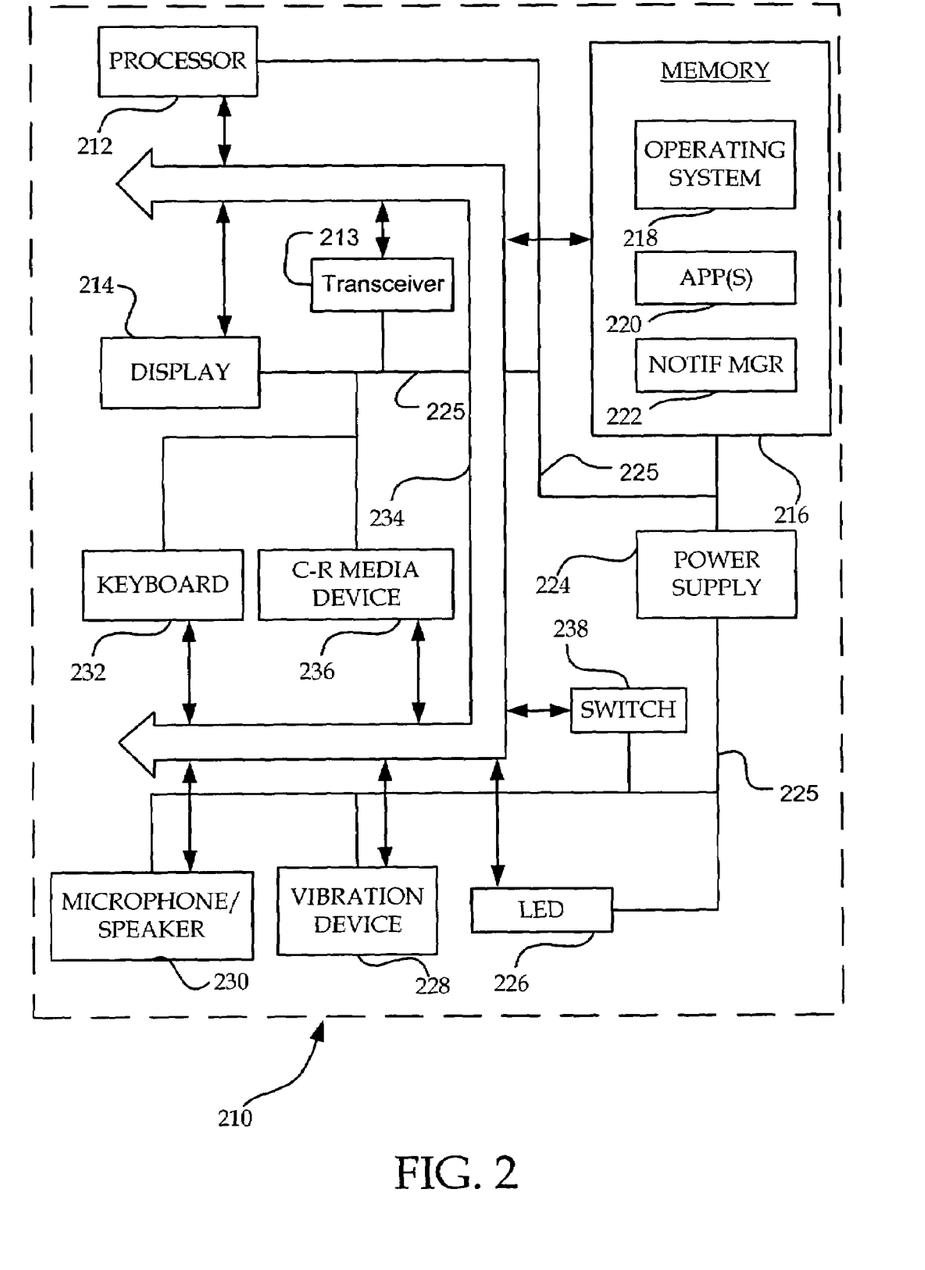
FIG. 2 illustrates an example of a suitable computing system environment on which embodiments of the invention may be implemented.

FIG. 2 illustrates an example of a computing cell phone system 210 in which embodiments of the invention may be implemented. The computing cell phone system 210 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices and the like.

FIG. 2 shows functional components of the computing cell phone 210. Various other small computing devices may have all or some of the components illustrated in FIG. 2. The computing cell phone has a processor 212, a transceiver 213, a display 214, a memory 216, and a keyboard 232. Transceiver 213 has a modem, and transmitter and receiver for wireless communication. Keyboard 232 might be a limited key set or it might be a miniaturized full key set operable by thumbing the keys.

The memory 216 generally includes both volatile memory (e.g. RAM) and non-volatile memory (e.g. ROM, flash memory, PCMCIA cards, etc.). An operating system is resident in memory 216 and executes on the processor 212. The small computing device 210 includes an operating system 218, such as the Windows® CE or Pocket PC operating system from Microsoft Corporation or other operating systems including device specific operating systems for the computing device.

One or more application programs 220 are loaded into memory 216 and run on the operating system 218. Examples of applications include telephony programs, email programs, scheduling programs, PIM (personal information management) programs, word processing programs, spreadsheet programs, entertainment or game programs, Internet browser programs, and so forth. The computing cell phone 210 also has a notification manager 222 loaded in memory 216. The notification manager 222 handles notification requests from the applications 220 to the user.

The computing cell phone 210 has a power supply 224, which is implemented as one or more batteries. Power from the power supply is supplied to the devices in the computing cell phone over the power lines 225. The power supply 222 might further include an external power source that overrides or recharges the batteries mounted in the device. The external power source might include an AC adapter or a powered docking cradle.

The computing cell phone 210 is also shown with two types of external personal notification plus a microphone/speaker 230. The external notification devices are an LED 226 and a vibration device 228. In addition the speaker in the microphone/speaker 230 may be used to provide audio notification. These notification devices are directly coupled to the power supply 222 so that when activated, they remain on for a duration dictated by the notification mechanism. Switch 238 is controlled by the processor 212 to shut off power to conserve energy. All of the devices within the computing cell phone 210 communicate with each other over the internal data and control bus 234.

The computing cell phone 210 typically includes at least some form of computer readable media. Computer readable media can be any available media that can be accessed by small computing device 210. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing cell phone 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

In the description of the policy engine, which follows in reference to FIGS. 3-6, the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
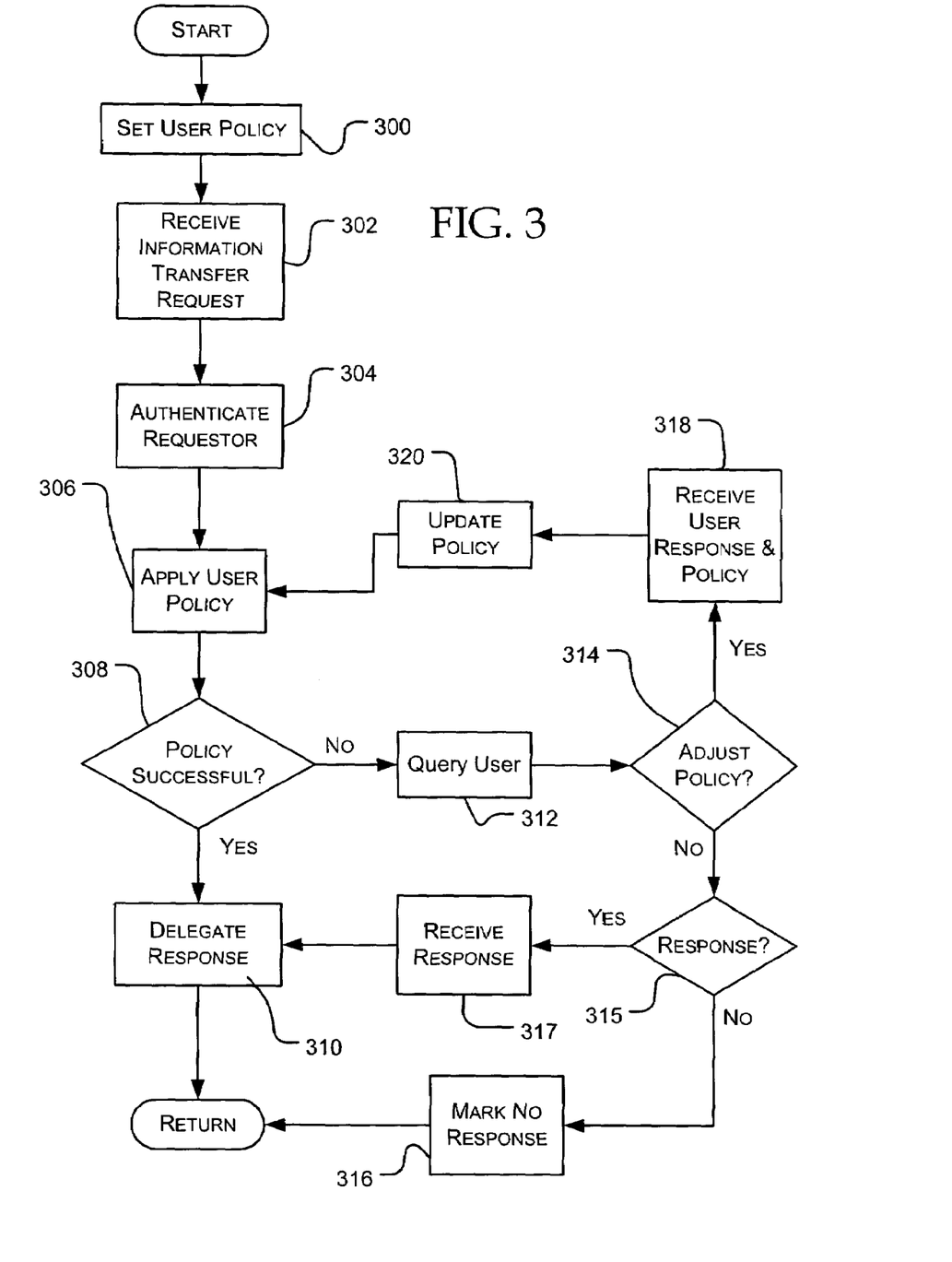
FIG. 3 illustrates the main operational flow of operations for delegating responses and controlling the responses with a user policy according to one embodiment of the present invention.

FIG. 3 illustrates the operational flow of the policy engine as it provides an automated response from a user's computing system according to a user policy as controlled by the user at the user's computing system. The user's computing system in one embodiment is the computing cell phone; however, the invention might be embodied in any type of computing system participating in communications with other computing systems requesting information from the user's computing system. The operation flow begins at set policy operation 300. The user enters into the user's computing system, the user policy parameters and predetermined response information that the policy engine may use to generate a policy controlled response.

Access to the user policy is limited to the user by the user's exclusive control of the user's computing system. This is accomplished by password protection to grant access to the user's computing system or the set policy operation 300. Where the user's computing system is a computing cell phone, exclusive control of user policy may be accomplished by the user physically policing who has access to the computing cell phone. Biometric access control may also be used, as may other common techniques for access control.

With a user policy set in the user's computing system, receive operation 302 waits to receive an information transfer request from a requesting communicating system wishing to open a dialog with the user's computing system in order to send or receive data. In the situation where the user's computing system is a computing cell phone, the computing cell phone may receive this information transfer request simply because it is in the communication domain, or transmission range, of the requesting computing system. Authenticate operation 304 then commences a conversation between the user's computing system and the requesting computing system, using an appropriate cryptographic protocol, to verify that the requesting system is what it identifies itself as, and that the user's computing system and the requesting computing system have compatible communication protocols.

Once authentication is satisfied, the apply policy module 306 applies the user policy to the information transfer request. The apply user policy module 306 operates to compare parameters pre-established by the user against parameters associated with the request from the requesting computing system.

Policy successful test operation 308 detects whether the application of the user policy was successful. A successful application of the policy in this test indicates that the user's computing system, can automatically handle the response with no interaction required from the user. If this is the case, the operation flow branches from test operation 308 to delegate response module 310.

The delegate response module 310 will provide a response back to the requesting computing system based on a response level determined by the apply user policy module 306. A response may be to send response information requested by the requesting computing system (RCS), and it may also be authorization for the RCS to send information it wishes to sent to the user's computing system. As discussed above, possible responses are an unqualified response, a qualified response and no response. In an unqualified response the user's computing system returns all requested information to the RCS without restrictions on its use by the RCS. An unqualified response might also be authorization to RCS to send to the user's computing system information with or without restrictions on its use. This would occur in a situation where the user policy reflects a high level of trust and acceptance of a request from the requesting computing system. It might also indicate that the request from the RCS is within a field of requests that the user is expecting and, therefore, the user's computing system will provide a complete response to the RCS or authorize a complete transfer of information from the RCS.

A qualified response is provided when the user policy indicates that the requesting system or the type of request has a lower level of response entitlement. The qualified response might be a partial response—a portion of the information requested is returned or a complete response—all of the information requested is returned. Also, a qualified response, complete or partial, might have a restricted use policy—rules or restrictions—attached to use or further distribution of the qualified response by the requesting computing system (RCS). Where the RCS wishes to send information, a qualified response from the user's computing system might be a restriction on what information may be sent, or a notice of which restricted use policies will be accepted.

A no response indication from the apply policy module 306 would occur where the policy indicates the requesting system is not entitled to a response, or the request is outside of the field of information that the user wishes to provide the requesting system. In the event of a no response decision, the delegate response module 310 might transmit a message indicating that the requesting system is not entitled to receive an answer to the request or it might simply not respond at all.

Returning to the policy successful test operation 308, if the policy was not able to determine a level of response and appropriate response information, then the operation flow will branch "No" to query operation 312. Query operation 312 displays a query to the user indicating the request and giving the user an opportunity to send a response. Adjust policy test 314 detects whether or not the user elects to send a response and adjust the user policy. When the user does wish to respond and adjust the policy, then the operation flow branches "Yes" from the adjust policy test 314 to the receive operation 318. Receive operation 318 receives and stores the response information input by the user and also receives new policy rules and/or values, i.e. parameters, input by the user for the user policy. Update operation 320 updates the user policy with the new parameters, for responding to the requestor and/or the type of request received from the requesting computing system. Accordingly, the receive operation 318 and the update operation 320 have now stored in the user's computing system response information and user policy parameters appropriate for the request from the requesting system. The operation flow returns to the apply user policy module 306, and the updated user policy is used to process the pending request. The operation flow now proceeds through test 308 successfully to delegate response module 310. The delegate response module will send the new response information to the requesting computing system.

Figure 4:
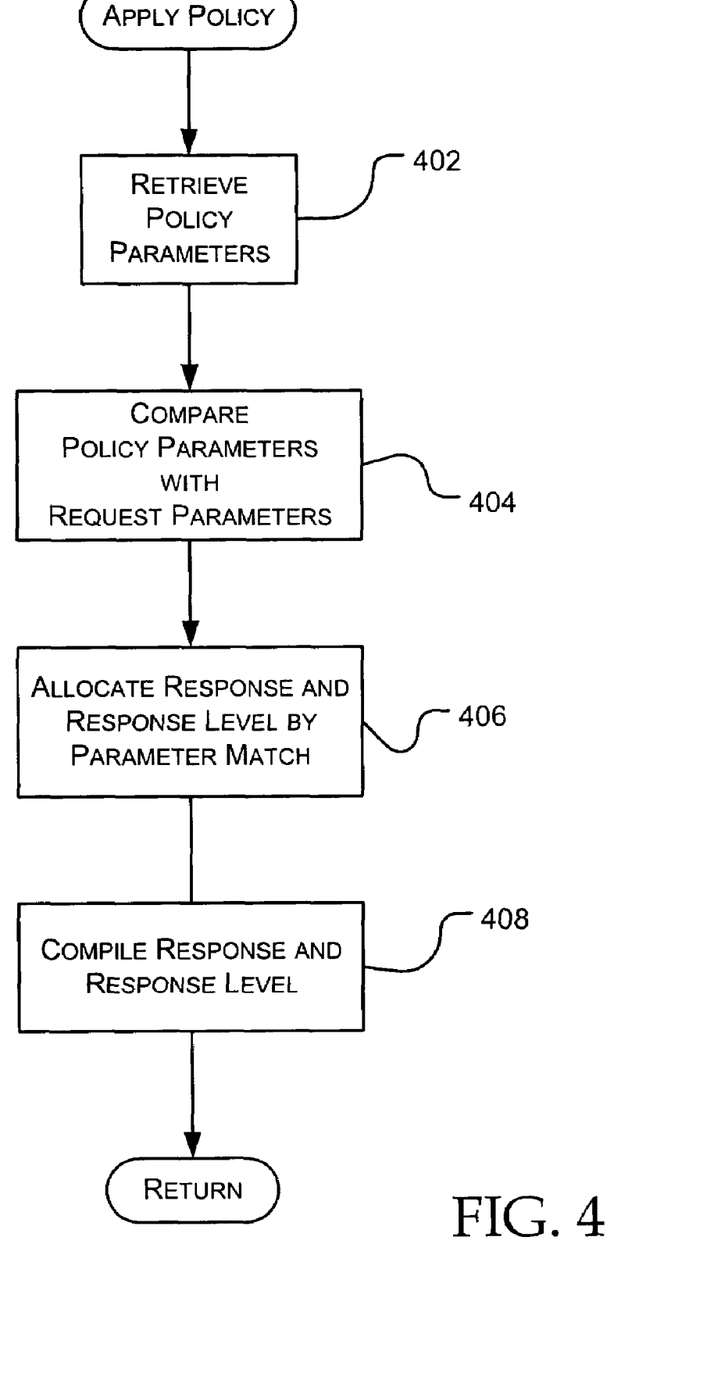
FIG. 4 shows the operational flow of operations performed by the apply policy module 306 in FIG. 3.

If the user elects not to adjust the user policy, the operation flow branches "No" from test operation 314 to response test operation 315. If the user wants to send a response but not adjust user policy, test operation 315 will detect that the user elects to input a response, and the operation flow branches Yes to receive operation 317. Receive operation 317 receives the response input by the user and passes it to the delegate response module 310. If the user does not want to send a response, the operation flow branches No from response test operation 315 to mark no response operation 316. Operation 316 then causes the user's computing system to send an error message or to send no reply at all to the requesting computing system FIG. 4 shows the operations performed by the apply policy module 306 in FIG. 3. In FIG. 4 the operation flow begins at retrieve operation 402. Retrieve operation 402 retrieves the policy parameters set by the user. As discussed earlier, these parameters would include a list of acceptable requesting systems. Also the rules may specify the type of request to be answered and whether there are restrictions on use of the response information by the requesting computing system. Further, these parameters may in turn depend on other rules and values in the user policy, as well as rules and values accepted by the user from other sources.

Compare operation 404 now has the policy parameters from the user policy and also the parameters embedded in the request from the requesting system. The compare operation 404 applies its parameters to the parameters of the received request using an appropriate decision procedure to generate an appropriate response to the request. Based on the result of this decision procedure, the allocate operation 406 allocates an automated response—response information or authorization to send information—and a response level. The response level indicates whether the response which will be returned to the requestor is qualified and what restricted use policy, if any, is to be applied to its use by the requesting computing system.

Compile operation 408 then assembles the response and response level for use by the delegate response module 310 (FIG. 3). When the response is sending information from the user's computing system to the requesting computing system, the information may be compiled in different ways. In one embodiment the apply module creates a filtered response, i.e. the actual response information to be sent to the requesting computing system. In another embodiment, the apply module pulls all possible response information for the request and forwards the information to the delegate response module. The delegate response module then searches through the information to generate a filtered set of response information according to the response level. The delegate response module will send the appropriate response according to the response level. The operation flow from the apply module then returns to FIG. 3 where the policy successful test is passed and delegate response module 310 sends the response according to the response level.

Figure 5:
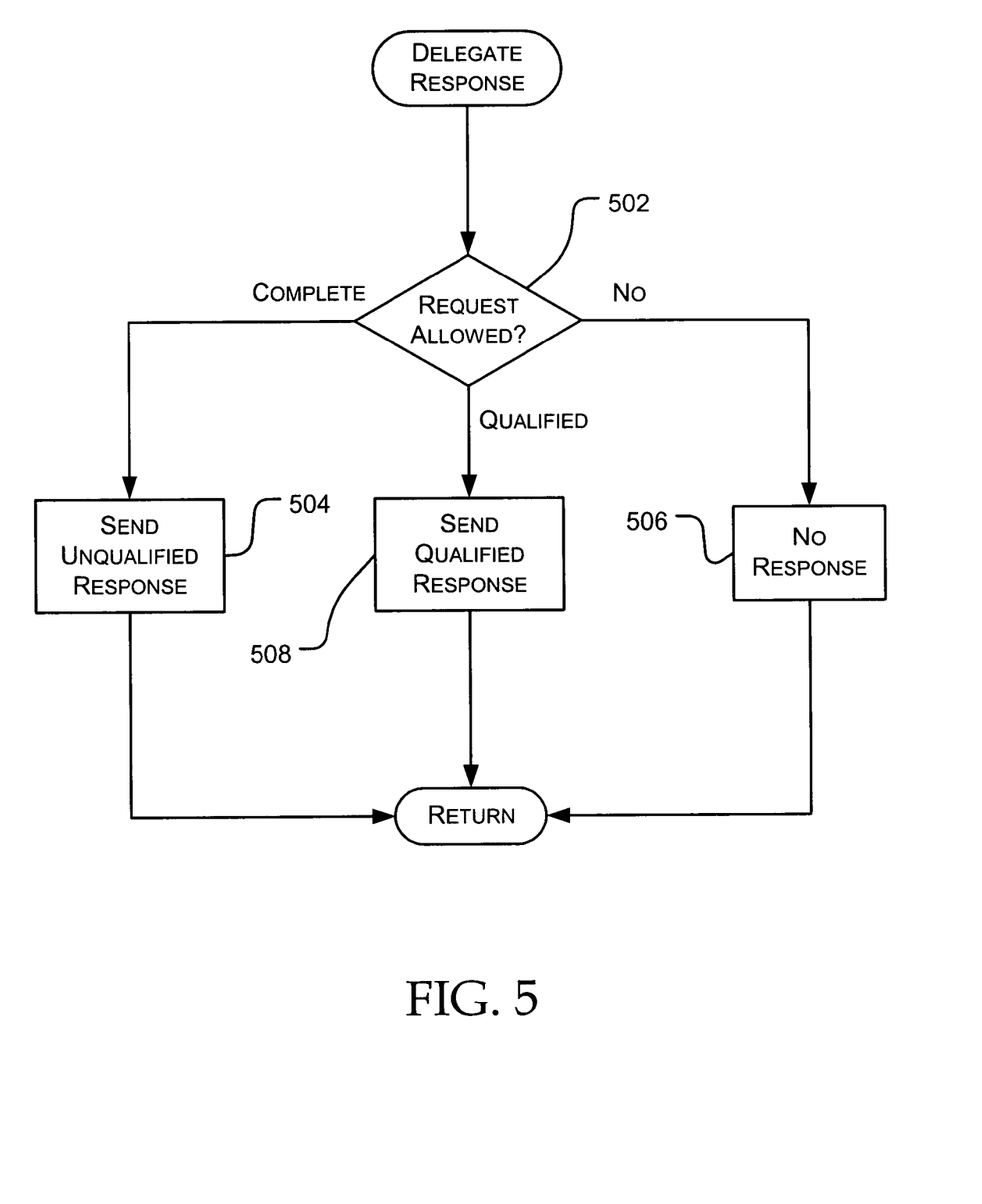
FIG. 5 illustrates the operational flow of operations performed by the delegate response module 310 in FIG. 3.

FIG. 5 illustrates the operations performed by the delegate response module 310 in FIG. 3. In FIG. 5 the operation flow begins at request allowed test operation 502. The allowed test operation detects from the response level whether an unqualified response can be sent, a qualified response can be sent, or no response is to be sent. If the policy parameters and request parameters indicate an unqualified response is allowed, then the operation flow branches from the allowed test 502 to the send operation 504. Send operation 504 sends all of the information requested by the requesting system and with no qualifications or sends authorization to the requesting system to send information to the user's system with no qualifications. On the other hand, if the request allowed test 502 detects from the response level that the policy parameters provide for no response to this request, then the operation flow branches to the no response operation 506. Typically, the no response operation would send nothing back to the requesting system. Alternatively, an error message or disqualification message might be sent to the requesting system.

If the allowed test operation 502 detects that the response level is such that the use of the response information by the requesting system is qualified and/or a partial response to the request is to be sent or a qualified authorization to send information to the user's system is to be sent, then the operation flow branches from the allowed test operation 502 to the qualified response module 508. The qualified response module 508 may send a complete response with qualifications or restrictions on its use, or it may send a partial response with or without qualifications and restrictions on its use. The operations performed by the qualified response module 508 are shown in detail in FIG. 6.

If the response is to send an authorization to the requesting computing system to send information to the user's computing system, the qualified response module simply sends the authorization with a notice regarding restrictions on received information that it will accept. Restrictions might be what type of information it will accept and whether it will accept information with a restricted use policy attached, and if so, which restricted policies will or will not be accepted.

Figure 6:
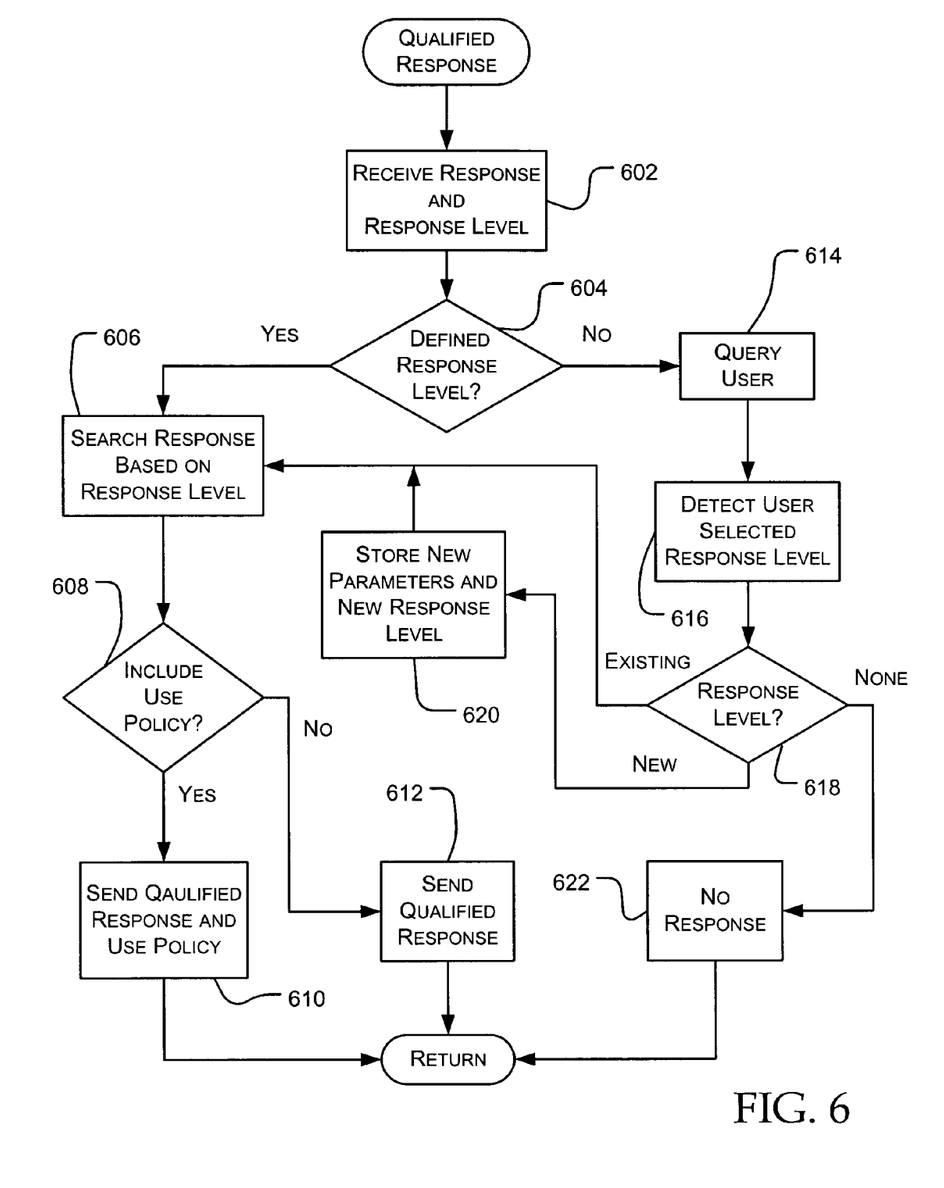
FIG. 6 shows the operational flow of operations performed by the qualified response module 508 in FIG. 5.

If the response is to send qualified response information to the requesting computing system, the operations of the qualified response module are more complex and are shown in FIG. 6. The operation flow for the qualified response module begins with receive operation 602 in FIG. 6. To the extent response information and or response level exists, the receive operation 602 receives the response information and the response level provided by the applied policy module 306 or the receive operation 317 (FIG. 3). Defined response level test operation 604 detects whether the applied policy module was able to assign a defined response level. In almost every instance the apply policy module will assign a response level. However, if the apply policy module fails to determine a response level, an option is provided by this test operation 604 to interact with the user. For example if the response was just input by the user and received at receive operation 317, there would not be a response level. For the present, however, we will assume that a defined response level has been received and the operation flow branches "Yes" from test operation 604 to search operation 606.

In one embodiment, the search operation 606 determines whether a restricted use policy is to accompany the qualified response; this determination is made according to the response level. In another embodiment, where the apply module has sent all possible response information, the search operation will determine whether a complete response or a partial response is to be sent as a qualified response. It will also determine in this embodiment whether the response is to be qualified by a restricted use policy that will be sent along with the response.

Include policy test operation 608 detects whether a restricted use policy is to be sent with the qualified response. If the restricted use policy is to be included, then the operation flow branches "Yes" from include test 608 to send response and policy operation 610. Send operation 610 transmits to the receiving station the qualified response with the use policy which controls how the requesting computing system may use the qualified response.

If the include test 608 detects that the restricted use policy is not to be included, then the operation flow branches "No" from test operation 608 to send qualified response operation 612. This send operation simply transmits to the receiving requesting system a partial response without a use policy attached. After the qualified response is sent, the program control returns to the main operating control program of the user's computing system.

Returning now to the defined response level test 604, the operation flow will branch "No" from this test when the applied policy module is unable to assign a response level. In this event, query operation 614 will display to the user a query including the request and the proposed response. The query will ask the user for a response level to control qualification of the response. Detect operation 616 then detects a user selected response level input by the user. The user may select an existing or old response level or assign a new response level or indicate no response is to be sent. If the user indicates that no response is to be sent, then the operation flow will branch to the no response operation 622. Operation 622 will either send an error message to the requesting computing system or simply not reply to the requesting system.

If the response level test 618 detects that the user has selected an existing response level, that response level is provided to the sort operation 606, and the operation flow proceeds to send the qualified response with or without a restricted use policy according to the response level. On the other hand, if the response level test 618 detects a new response level has been assigned, then the operation flow branches from test 618 to store operation 620. Store operation 620 stores new parameters associated with the response level and also stores the response level. This in effect updates the user policy to be applied by the apply policy module.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. In a computer system, a method for sending from the computer system a user policy-controlled automated response to an information transfer request from a requesting computing system, the method comprising: setting a user policy controlled by a user, the user policy defining parameters for use in controlling an automated reply to information transfer requests from the requesting computing system; receiving the information transfer request from the requesting computing system; applying parameters of the user policy to the information transfer request to allocate a response and to set a response level based on the user policy in order to provide the user policy-controlled automated response to the requesting computing system; and delegating the response based on the response level and sending the response to the requesting computing system, wherein the act of delegating and sending the response comprises at least one of sending an unqualified response based on a first response level where the unqualified response is a complete response having no restrictions on use of transferred information; and sending a qualified response based on a second response level where the qualified response is a partial response with restrictions on the use of the transferred information, wherein the act of sending the qualified response comprises: detecting if use restrictions are to be included with the response sent to the requesting computing system, and attaching a restricted use policy to the response sent to the requesting computing system, the use policy controlling use and further distribution of the response by the requesting computing system.

2. The method of claim 1 wherein the response is response information requested by the requesting computing system.

3. The method of claim 1, wherein the act of delegating the response further comprises sending no response based on a third response level.

4. The method of claim 1, wherein the act of applying the user policy comprises:
comparing user policy parameters with request parameters in the information transfer request from the requesting computing system; and
allocating response information and setting the response level based on the comparison of the user policy parameters with the request parameters.

5. The method of claim 1 wherein the response is authorization for the requesting computing system to send information to the computer system.

6. The method of claim 5 further comprising:
delegating the response based on the response level and sending the response with a notification of restrictions on receipt of the information by the computer system, the restrictions being based on the response level.

7. A policy engine system stored in a computer readable storage medium in a computing cell phone for controlling automated responses from the computing cell phone to a requesting computing system, the controlled automated responses being based on a user policy specified by a user of the computing cell phone, the policy engine system comprising: a set policy module controlled by the user for entering and updating the user policy and response information; a database storing the user policy and response information; an apply policy module applying parameters of the user policy to information transfer requests from the requesting computing system and filtering stored response information to create a filtered response for the requesting computing system based on the parameters of the user policy; and a delegate response module sending the filtered response along with a use policy to the requesting computing system, wherein sending the filtered response comprises at least one of: sending an unqualified response based on a first response level where the unqualified response is a complete response having no restrictions on use of transferred information; and sending a qualified response based on a second response level where the qualified response is a partial response with restrictions on the use of the transferred information, wherein the act of sending the qualified response comprises: detecting if use restrictions are to be included with the response sent to the requesting computing system, and attaching a restricted use policy to the response sent to the requesting computing system, the use policy controlling use and further distribution of the response by the requesting computing system.

8. The system of claim 7 wherein the information transfer request is a send request to send information to the computing cell phone and:

the apply policy module in response to the send request creates an authorization for the requesting computing system to send information to the computing cell phone; and the delegate response module sends the authorization to the requesting computing system.

9. The system of claim 7, wherein the use policy contain rules for use of the filtered response by the requesting computing system.

10. The system of claim 7, wherein the use policy contains rules for distribution of the filtered response by the requesting computing system to other computing systems.

11. The system of claim 7, wherein the apply policy module comprises:
 a retrieve module retrieving policy parameters of the user policy from the database;
 a compare module comparing the policy parameters to request parameters in the information transfer request from the requesting computing system;
 an allocate module generating the filtered response based on a match between the policy parameters and the request parameters; and
 a compile module building the filtered response and a response level to pass to the delegate response module.

12. The system of claim 11, wherein the delegate response module comprises:
 a test module detecting whether the use policy is to be included with the filtered response, the use policy controlling use of the filtered response by the requesting computing system; and
 a send module sending the filtered response with the use policy when the test module detects the use policy is to be included and sending only the filtered response when the test module detects the use policy is not to be included.

13. The system of claim 7, wherein the computing cell phone is within communication domain of the requesting computing system and is being repeatedly polled by requests from the requesting computing system.

14. The system of claim 7 further comprising:
 a test module detecting whether the apply policy module created a filtered response;
 a query module for displaying the information transfer request and identity of the requesting computing system to the user when a filtered response was not created; and
 an update module receiving new response information and new user policy rules from the user, storing the new response information and updating the user policy in the database.

15. A computer storage medium for storing computer instructions for a computer process for sending from a computer system a personal, policy-controlled automated response to an information transfer request from a requesting computing system, the computer process comprising: receiving the information transfer request from the requesting computing system; applying parameters of a user policy exclusively controlled by the user to the information transfer request to compile a response and a response level based on the user policy; and sending the response to the requesting computing system based on the response level in order to provide the personal, policy-controlled automated response to the requesting computing system, wherein sending the response comprises at least one of: sending an unqualified response based on a first response level where the unqualified response is a complete response having no restrictions on use of transferred information; sending a qualified response based on a second response level where the qualified response is a partial response with restrictions on the use of the transferred information, wherein the act of sending the qualified response comprises: detecting if use restrictions are to be included with the response sent to the requesting computing system, and attaching a restricted use policy to the response sent to the requesting computing system, the use policy controlling use and further distribution of the response by the requesting computing system; and sending no response based on a third response level.

16. The computer storage medium of claim 15 wherein the computer process further comprises: setting the user policy controlled by the user, the user policy defining parameters for use in controlling a response to be provided as an automated reply to information transfer requests from the requesting computing system.

17. The computer storage medium of claim 15 wherein the response is response information requested by the requesting computing system.

18. The computer storage medium of claim 15, wherein the act of applying the user policy comprises:
 comparing user policy parameters with request parameters in the information transfer request from the requesting computing system; and allocating response information and setting the response level based on the comparison of the user policy parameters with the request parameters.

19. The computer storage medium of claim 15 wherein the response is authorization for the requesting computing system to send information to the computer system.

20. The computer storage medium of claim 19 further comprising:
 sending the response based on the response level and sending the response with a notification of restrictions on receipt of the information by the computer system, the restrictions being based on the response level.

* * * * *

UNITED STATES PATENT AND TRADEMARK OFFICE
CERTIFICATE OF CORRECTION

| | | |
|---|---|---|
| PATENT NO. | : 7,631,048 B2 | Page 1 of 1 |
| APPLICATION NO. | : 10/671185 | |
| DATED | : December 8, 2009 | |
| INVENTOR(S) | : John De Treville | |

It is certified that error appears in the above-identified patent and that said Letters Patent is hereby corrected as shown below:

In column 11, line 37, in Claim 13, after "within" insert -- a --.

Signed and Sealed this
Eighteenth Day of January, 2011

David J. Kappos
*Director of the United States Patent and Trademark Office*